(12) United States Patent
Matsuda

(10) Patent No.: US 6,734,885 B1
(45) Date of Patent: May 11, 2004

(54) INFORMATION PROCESSING APPARATUS, METHOD AND COMPUTER PROGRAM FOR VIRTUAL REALITY TRANSPARENT AVATARS

(75) Inventor: Satoru Matsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/390,035

(22) Filed: Sep. 3, 1999

(30) Foreign Application Priority Data

Sep. 30, 1998 (JP) .......................................... P10-277065

(51) Int. Cl.[7] .................................................. G09G 5/00
(52) U.S. Cl. ........................ 345/848; 345/706; 345/733; 345/757
(58) Field of Search ................................ 345/700, 706, 345/733, 751, 753, 757–759, 764, 768, 781, 835, 839, 848, 850

(56) References Cited

U.S. PATENT DOCUMENTS

| | | | | | |
|---|---|---|---|---|---|
| 5,736,982 | A | * | 4/1998 | Suzuki et al. ................ | 345/706 |
| 5,880,731 | A | * | 3/1999 | Liles et al. .................. | 345/758 |
| 6,057,856 | A | * | 5/2000 | Miyashita et al. ........... | 345/633 |
| 6,166,732 | A | * | 12/2000 | Mitchell et al. ............. | 345/733 |
| 6,219,045 | B1 | * | 4/2001 | Leahy et al. ................. | 345/757 |
| 6,229,533 | B1 | * | 5/2001 | Farmer et al. ............... | 345/473 |
| 6,329,986 | B1 | * | 12/2001 | Cheng ......................... | 345/419 |
| 6,366,285 | B1 | * | 4/2002 | Brush et al. ................. | 345/473 |
| 6,396,509 | B1 | * | 5/2002 | Cheng ......................... | 345/706 |
| 6,532,007 | B1 | * | 3/2003 | Matsuda ...................... | 345/419 |

* cited by examiner

*Primary Examiner*—Sy D Luu
(74) *Attorney, Agent, or Firm*—Bell, Boyd & Lloyd LLC

(57) ABSTRACT

The present invention provides an information processing apparatus, an information processing method and presentation medium. The information processing apparatus according to the present invention for presenting a 3-dimensional virtual spaces allowing an avatar being operated to communicate with other avatars includes a storage means for storing an indicator set to show whether or not information owned by the avatar can be communicated with the other avatars, and a judgment means for forming a judgment as to whether or not information owned by the avatar can be communicated with the other avatars on the basis of the indicator stored in the storage means. As a result, a plurality of clients are allowed to experience a 3-dimensional virtual space without substantially increasing the amount of processing of the system and the amount of communication on a transmission line.

34 Claims, 13 Drawing Sheets

INFORMATION MANAGEMENT TABLE

| AVATAR | OBJECTS EACH AN AURA INCLUDING ITS OWN POSITION | OBJECTS INCLUDED IN ITS OWN AURA | TRANSPARENCY FLAG |
|---|---|---|---|
| 6 1 | 5 1 | 5 1<br>6 3<br>6 4 | TRUE |
| 5 1 | 6 1 | 6 1 | FALSE |

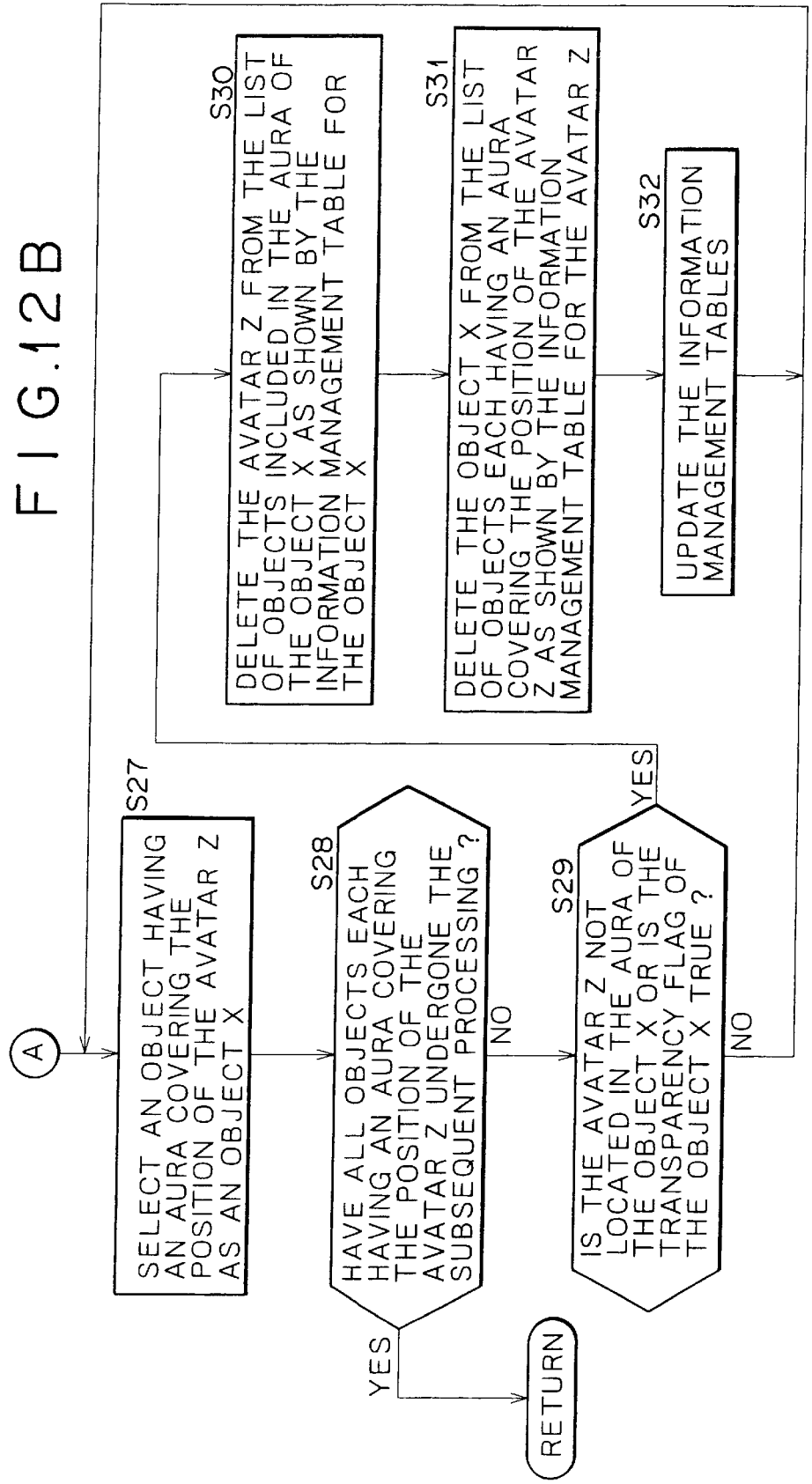

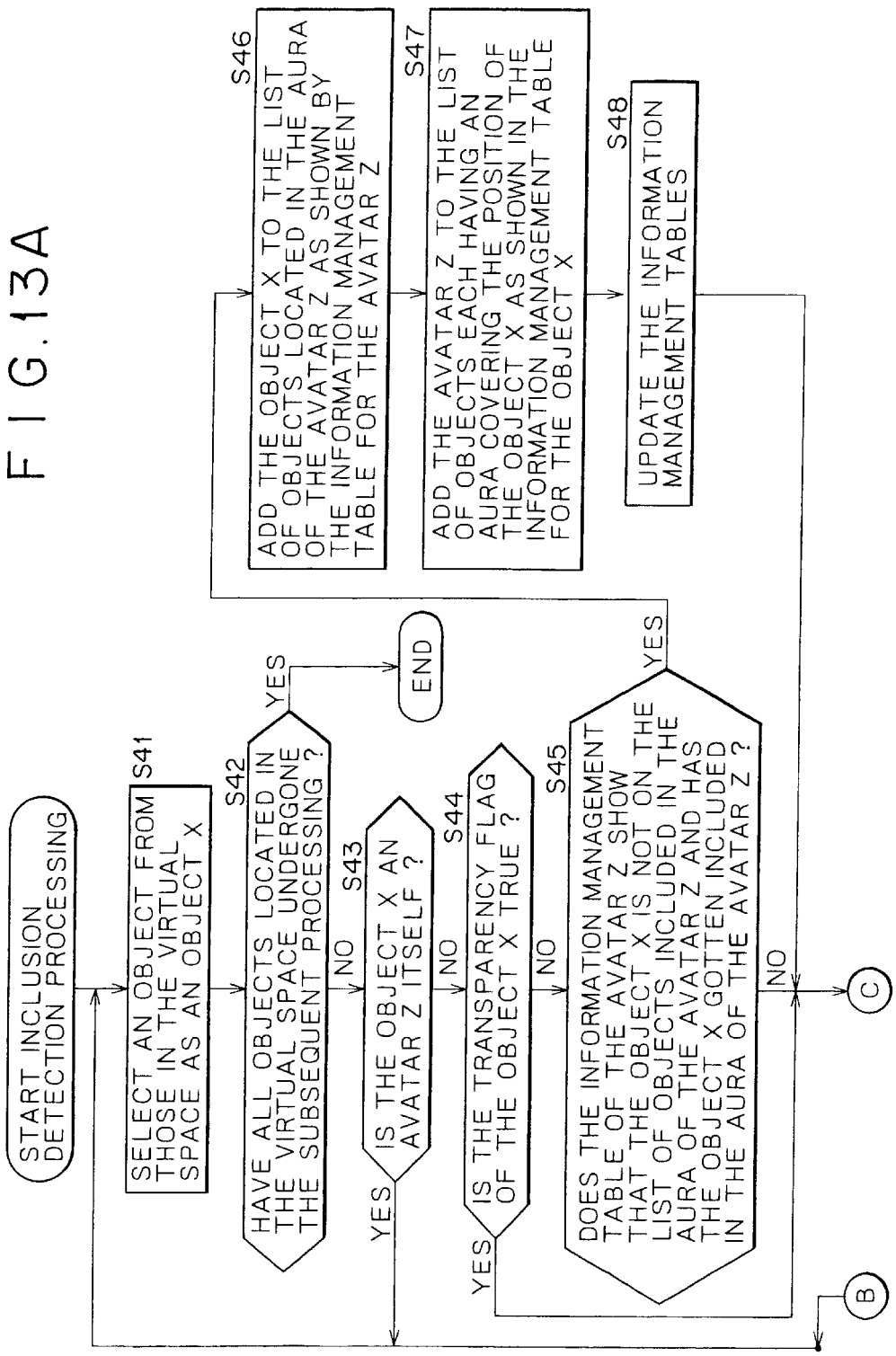

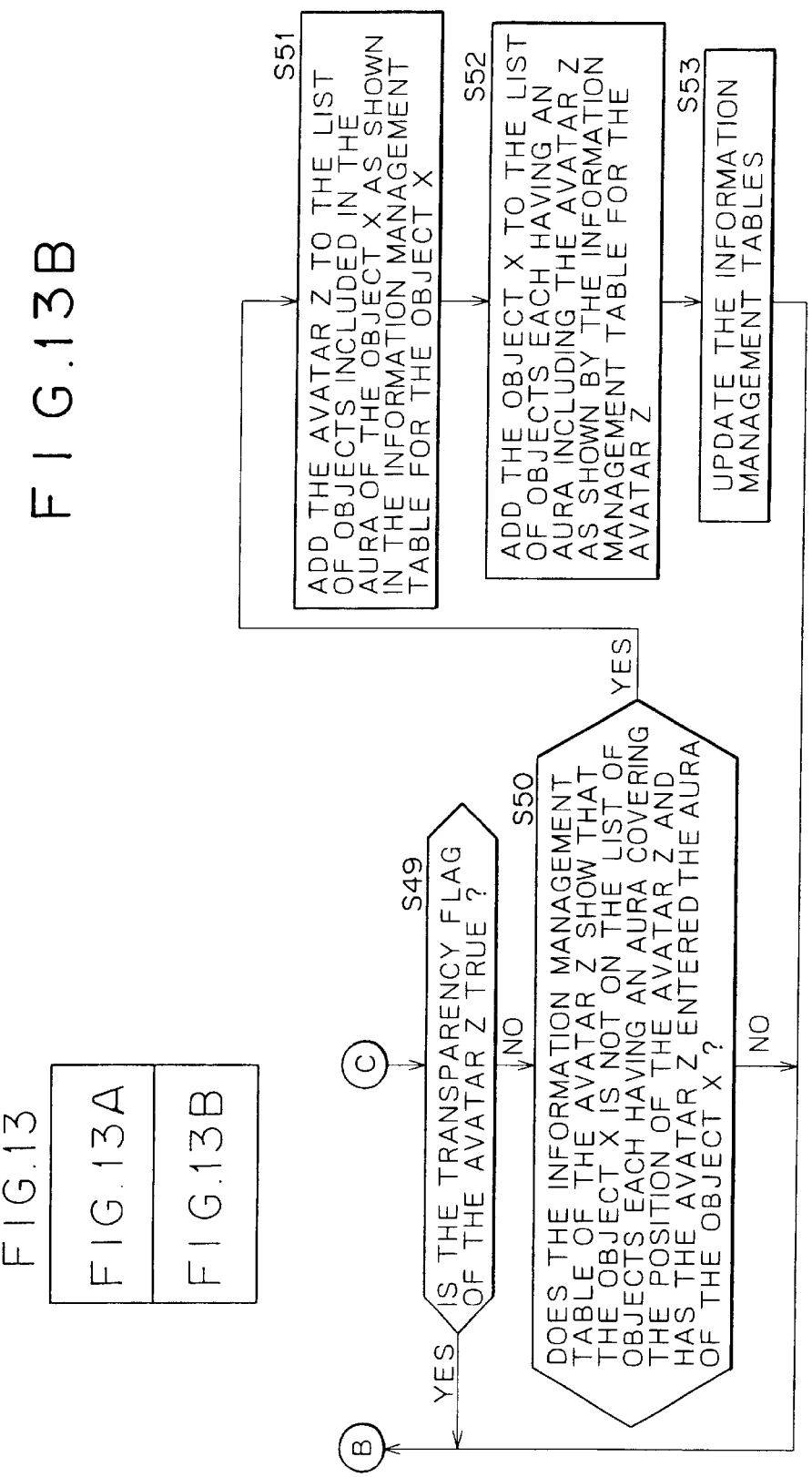

US 6,734,885 B1

INFORMATION PROCESSING APPARATUS, METHOD AND COMPUTER PROGRAM FOR VIRTUAL REALITY TRANSPARENT AVATARS

CROSS-REFERENCE TO RELATED APPLICATIONS

The present application is related to five other applications commonly assigned and concurrently filed therewith: application Ser. No. 09/389,812; application Ser. No. 09/389,801; application Ser. No. 09/389,773; application Ser. No. 09/389,803; application Ser. No. 09/390,036, all of which are incorporated herein by reference.

BACKGROUND OF THE INVENTION

1. Field of the Invention

In general, the present invention relates to an information processing apparatus, an information processing method and a computer program. More particularly, the present invention relates to an information processing apparatus, an information processing method and a computer program for presenting a 3-dimensional virtual space wherein the user is capable of operating its avatar to communicate with other avatars.

2. Description of the Related Art

A related art cyberspace service called Habitat (a trademark) is known in the field of the so-called PC (personal computer) communication service, such as NIFTY-Serve (a trademark) and CompuServe (a trademark), in which a plurality of users connect their PCs to a central host computer through modems and a public telephone-line network to make accesses to the host computer in accordance with a predetermined communication protocol.

Lucas Film started development of Habitat in the year of 1985. And after about three years' operation of Habitat by Quantum Link, a commercial network company, NIFTY-Serve started providing a Habitat service as Fujitsu Habitat (a trademark) in February 1990. In Habitat, an incarnation of the user which is an object representing the user itself appears in a virtual city called a Populopolis which is rendered by 2-dimensional graphics, allowing the user to have, among others, a chat with another user. The parturition of the user is referred to as an "avatar" which originally means the incarnation of a Hindu deity appearing in an Indian myth. In this context, a "chat" is a real-time conversations exchanged in text being displayed on a screen as a result of operations by a user to enter characters via a keyboard. A more detailed description of Habitat is found in Michael Benedikt, ed., Cyberspace: First Steps 282–307 (1991).

In a related art cyberspace system operated in a PC communication service of this type, states of a row of houses on a street and rooms in each of the houses in the virtual city are rendered by 2-dimensional graphics, so that in order to move an avatar inward or outward with respect to the background of a 2-dimensional graphic, the avatar is merely moved up and down over the background. That is to say, the power of expression for display is poor to feel a pseudo experience of a walk or a movement in the virtual space. In addition, since the user sees the virtual space, in which the avatar representing the user itself and another avatar for other are displayed, from a station point of a third person, the sense of a pseudo experience is also lost in this respect.

In order to eliminate the shortcomings described above, a function to display the virtual space by 3-dimensional graphics and to allow the user to walk about in the space with a high degree of freedom as seen from a station point of the avatar is implemented by utilizing a descriptive language of 3-dimensional graphic data called a VRML (Virtual Reality Modeling Language) as is disclosed in U.S. patent application Ser. No. 08/678,340. Details of the VRML are described in references such as Mark Pesce, VRML: Browsing & Building Cyberspace (1995), and "Recent Trends in VRML and CyberPassage" authored by Kohichi Matsuda and Yasuaki Honda, bit (Kyoritsu publication)/1996, Vol. 28, No. 7, pages 29 to 36; No. 8, pages 57 to 65; No. 9, pages 29 to 36 and No. 10, pages 49 to 58.

In addition, official and complete specifications of the "Virtual Modeling Language Version 2.0 (ISO/IEC CD 14772)" are available on the Internet.

VRML2.0 which is the most recent version of the VRML can be used to describe and express an autonomous behavior of an object in a 3-dimensional virtual space. Thus, in a behavior to walk about in a virtual space displayed by 3-dimensional graphics in a browser for VRML2.0, that is, a 3-dimensional virtual space, as seen from the station point of the avatar, the user is allowed to have a feeling as if the user itself were actually walking about the 3-dimensional space.

A typical browser for VRML2.0 and software for a shared server are a "Community Place (a trademark) Browser/Bureau" developed as a product by Sony Corporation, the present assignee, a beta version of which (a prototype) can be downloaded from the Internet website of Sony.

In an observation study, for example, a number of clients each want to see and walk about the 3-dimensional virtual space by operating its avatar. For each operation, the amount of system processing increases, causing the amount of communication on a transmission line to rise as well since every avatar shares information with other avatars. For this reason, it is necessary to impose an upper limit on the number of clients allowed to participate in the 3-dimensional virtual space each as a guest who wants to have experience of the 3-dimensional virtual space before becoming a regular client.

SUMMARY OF THE INVENTION

The present invention allows a number of clients to have experience in the 3-dimensional virtual space without increasing the amount of system processing and the amount of communication on the transmission line.

According to one aspect of the present invention, there is provided an information processing apparatus for presenting a 3-dimensional virtual space allowing an avatar of a plurality of avatars in the 3-dimensional virtual space being operated to communicate with one or more other avatars of the plurality of avatars. The information processing apparatus includes a storage means, a judgment means, and a processing means. The storage means stores an indicator set to show whether information owned by the avatar can be communicated with the other avatars. The judgment means determines whether the information owned by the avatar can be communicated with the other avatars, based on the indicator stored in the storage means. The processing means processes the information to be communicated with the other avatars, as determined by the judgment means.

According to another aspect of the present invention, there is provided an information processing method for presenting a 3-dimensional virtual space allowing an avatar of a plurality of avatars in the 3-dimensional virtual space being operated to communicate with one or more other avatars of the plurality of avatars. The information processing method includes a storage step, a judgment step, and a processing step. The storage step stores an indicator set to show whether information owned by the avatar can be communicated with the other avatars. The judgment step determines whether the information owned by the avatar can be communicated with the other avatars, based on the indicator stored at the storage step. The processing step processes the information to be communicated with the other avatars, as determined in the judgment step.

According to a further aspect of the present invention, there is provided a computer-readable medium for presenting a program executable by a computer to drive an information processing apparatus for presenting a 3-dimensional virtual space allowing an avatar of a plurality of avatars in the 3-dimensional virtual space being operated to communicate with one or more other avatars of the plurality of avatars. The program carries out processing including a storage step, a judgment step, and a processing step. The storage step stores an indicator set to show whether information owned by the avatar can be communicated with the other avatars. The judgment step determines whether the information owned by the avatar can be communicated with the other avatars, based on the indicator stored at the storage step. The processing step processes the information to be communicated with the other avatars, as determined in the judgment step.

According to the present invention, an indicator set to show whether or not information owned by an avatar can be communicated with other avatars is stored and a judgment as to whether or not information owned by the avatar can be communicated with the other avatars is formed on the basis of the stored indicator. As a result, a plurality of clients are allowed to have experience of a 3-dimensional virtual space without substantially increasing the amount of processing of the system and the amount of communication on a transmission line.

A better understanding of the features and advantages of the present invention will be obtained by reference to the following detailed description and accompanying drawings which set forth illustrative embodiments in which the principles of the invention are utilized.

BRIEF DESCRIPTION OF THE DRAWINGS

FIGS. 12A–12B are flowcharts representing details of departure detection processing; and FIGS. 13A–13B are flowcharts representing details of inclusion detection processing.

DETAILED DESCRIPTION OF THE PREFERRED EMBODIMENTS

Figure 1:
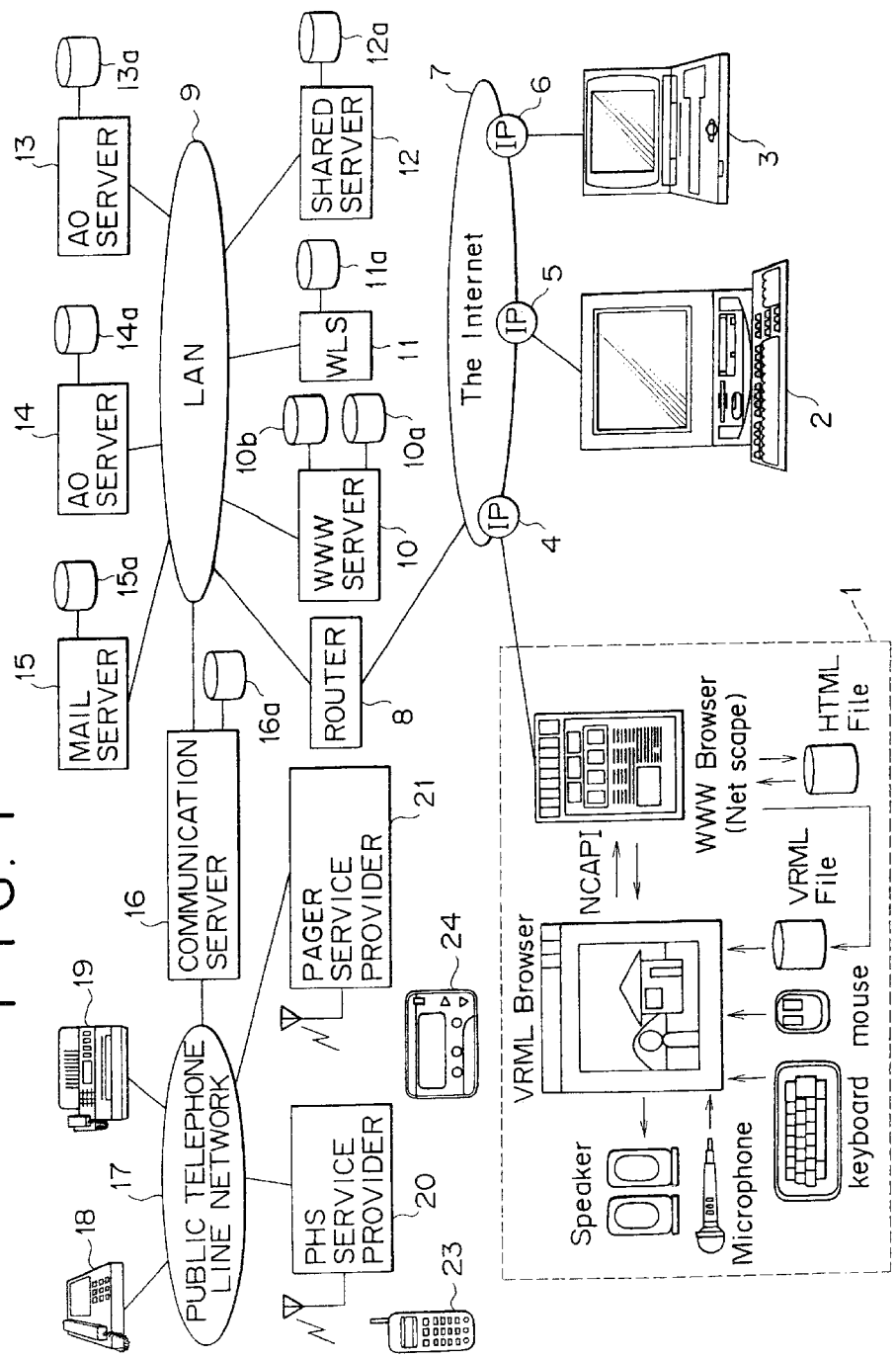
FIG. 1 is a block diagram showing a typical configuration of a system presenting a shared virtual space to which the present invention is applied.

FIG. 1 is a block diagram showing a typical configuration of a system presenting a shared virtual space to which the present invention is applied. It should be noted that the system cited in this specification means an entity obtained as a result of logically putting a plurality of apparatuses in a set without regard to whether or not the apparatuses are physically accommodated in a box.

As shown in FIG. 1, client PCs (personal computers) 1 to 3 are connected to the Internet 7 through IPs (Internet connection service providers) 4 to 6, respectively. In each of the client PCs 1 to 3, a VRML browser and a WWW browser are installed and ready to operate.

The client PCs 1 to 3 each have two functions, namely, a 3D-client function and a 2D-client function. The function for a 3D client is used to notify a shared server 12 periodically or if necessary of data such as information on the location of the client PC, to receive information shared by other 3D objects from the shared server 12 supplied thereto and to display it. On the other hand, the function for a 2D client is executed to transmit a request for information to a WWW server 10 in accordance with an HTTP, to receive a response to the request from the WWW server 10 and to display mainly 2-dimensional information. When a URL is included in information received from the shared server 12, the 3D-client issues a request for an access to the URL to the 2D client. At this request, the 2D-client makes an access to the URL (in actuality to the WWW server 10) to download data such as the shape of an object and forward the data to the 3D client.

A LAN (Local Area Network) 9 is connected to the Internet 7 through a router 8. Connected to the LAN 9 are the WWW server 10, a WLS (World Location Server) 11, the shared server 12, AO (Application Object) servers 13 and 14, a mail server 15 and a communication server 16. The WWW server 10 has hard discs (HDDs) 10a and 10b whereas the other servers 11 to 16 have HDDs 11a to 16a, respectively.

It should be noted that the AO server 13 has a program for communicating with the shared server 12 to present an application object (AO) such as a robot or an electronic pet which moves autonomously in a virtual space, for example. Much like the 3D-client, the AO server 13 communicates with the shared server 12 to report information on itself and to receive information shared by other 3D objects.

The communication server 16 is connected to a telephone 18 or a facsimile 19 through a public telephone line network 17, and is radio-connected to a PHS (Personal Handyphone System) terminal 23 through a PHS service provider 20 and to a pager terminal 24 through a pager service provider 21.

Figure 2:
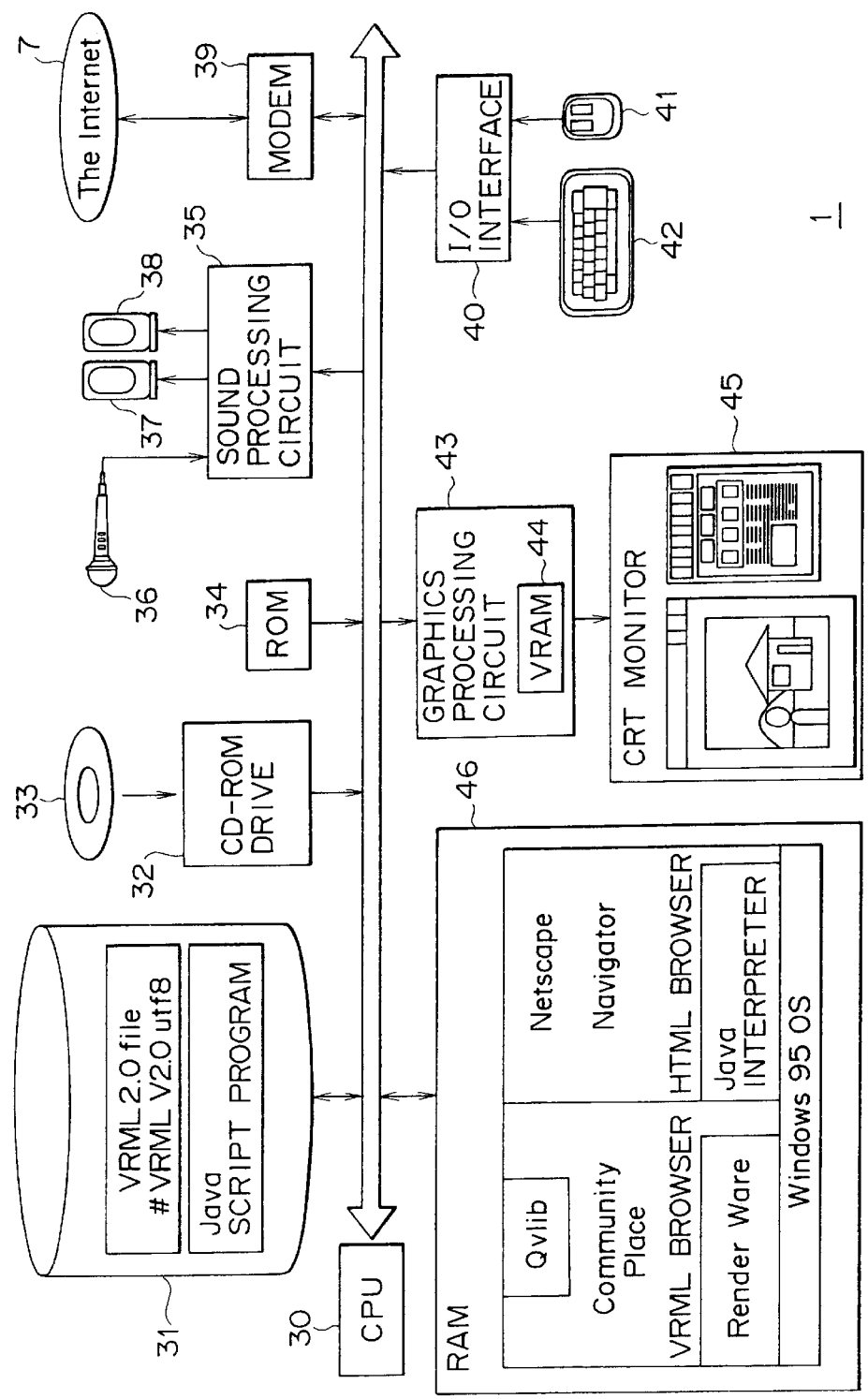
FIG. 2 is a block diagram showing a typical configuration of a client PC employed in the system shown in FIG. 1.

FIG. 2 is a block diagram showing a typical configuration of hardware of the client PC 1. In this configuration, a CPU 30 carries out various kinds of processing by executing a program stored in a ROM 34. A HDD 31 is used for storing, among other information, VRML contents such as VRML2.0 files and predetermined script programs written in the Java language (a trademark of Sun Microsystems, Inc.). A CD-ROM drive 32 reads out VRML contents stored in a CD-ROM disc 33.

Connected to a microphone 36 as well as a right and a left speakers 37 and 38, a sound processing circuit 35 inputs a sound from the microphone 36 or outputs sounds such as music and sound effects to the speakers 37 and 38. A modem 39 connected to the Internet 7 is used for exchanging data with the Internet 7. An I/O (input/output) interface 40 receives operation signals from a mouse 41 and a keyboard 42. A graphics circuit 43 includes an embedded VRAM 44 for storing picture data completing various kinds of processing. The graphics circuit 43 reads out data from the VRAM 44, outputting the data to a CRT monitor 45.

A Netscape Navigator browser, a Java interpreter and the Community Place Browser are loaded into a RAM 46 to be executed by the CPU 30. The Netscape Navigator is a WWW browser running under the Windows 95 (a trademark of Microsoft Corp.) and the Community Place Browser is a VRML2.0 browser developed by Sony Corporation, the assignee of the present application.

The VRML2.0 browser implements QvLib (which is a library, or a parser, for interpreting the VRML syntax developed and gratuitously released by Silicon Graphics, Inc.) and RenderWare (which is a software renderer developed by Criterion Software Ltd., UK) or a parser and a renderer having capabilities equivalent to those of QvLib and RenderWare, respectively.

As shown in FIG. 1, the Community Place Browser exchanges various kinds of data with the Netscape Navigator browser serving as a WWW browser in accordance with a NCAPI (Netscape Client Application Programming Interface, a trademark).

The Netscape Navigator browser receives an HTML file and VRML contents (including a VRML file and a script program written in the Java) transmitted by the WWW server 10 by way of the Internet 7, storing the HTML file and the VRML contents in the local HDD 31. The Netscape Navigator browser processes the HTML file, displaying a text and a picture obtained as a result of the processing on a CRT monitor 45. On the other hand, the Community Place Browser processes the VRML file to display a 3-dimensional virtual space on the CRT monitor 45 and changes behaviors of objects in the 3-dimensional virtual space and other display states in accordance with a result of execution of the script program by the Java interpreter.

It should be noted that the other client PC 2 and PC 3 each have the same configuration as the client PC 1 even though the configurations of the PC 2 and PC 3 are not shown explicitly in the figure.

Figure 3:
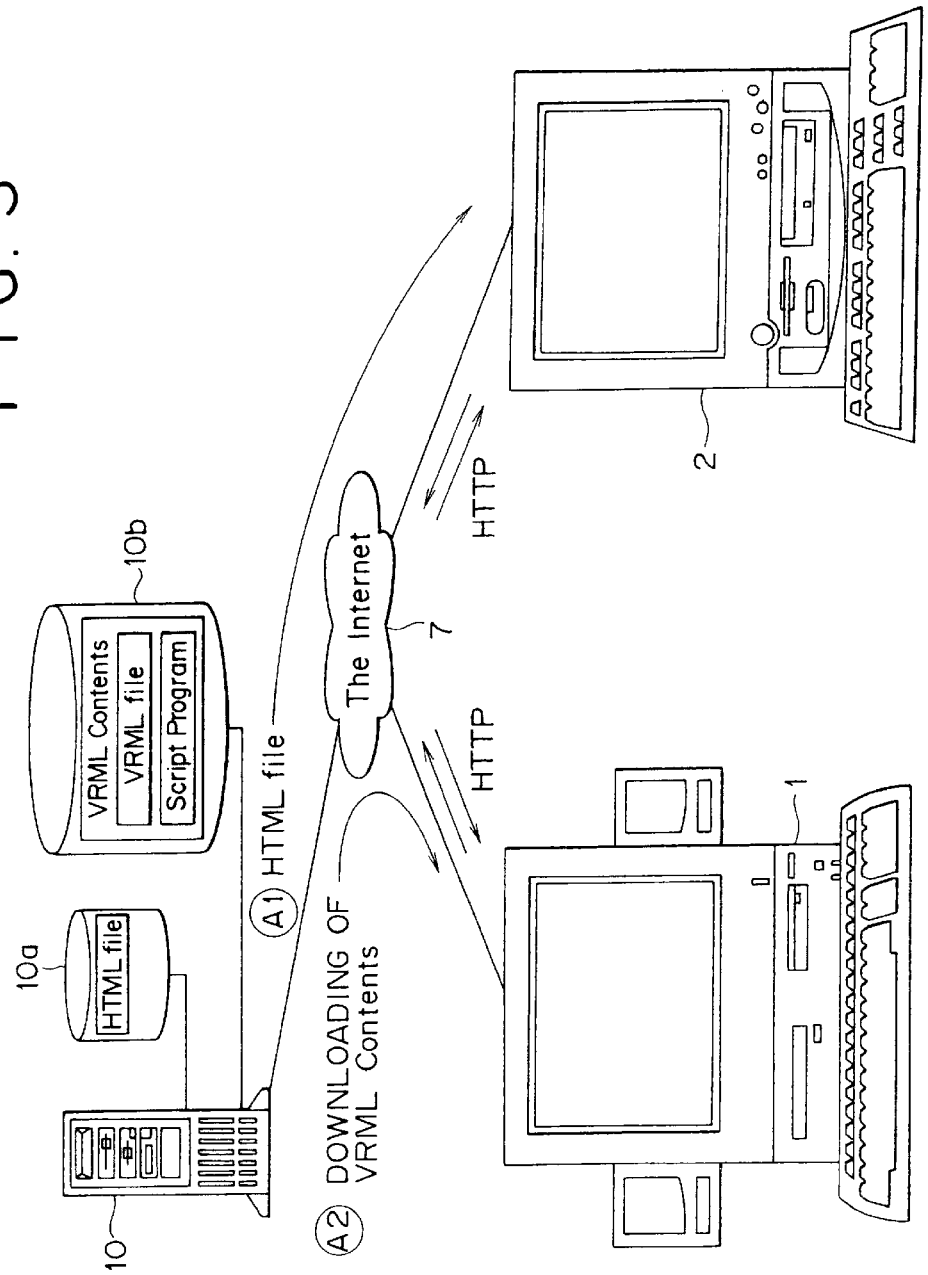
FIG. 3 is an explanatory diagram used for describing the operation of the system shown in FIG. 1.

Next, the operation of the embodiment described above is explained by referring to FIGS. 3 to 5. In the state shown in FIG. 3, first of all, a homepage on a web site providing VRML contents is browsed by using the WWW browser as shown by reference number A1. Then, the user of the client PC 1 or 2 downloads VRML contents comprising a VRML2.0 file and a script program written in the Java to enable autonomous motions in a VRML space as shown by reference number A2.

It is needless to say that VRML contents can also be obtained by letting the CD-ROM drive 32 read out the contents from the CD-ROM disc 33.

Figure 4:
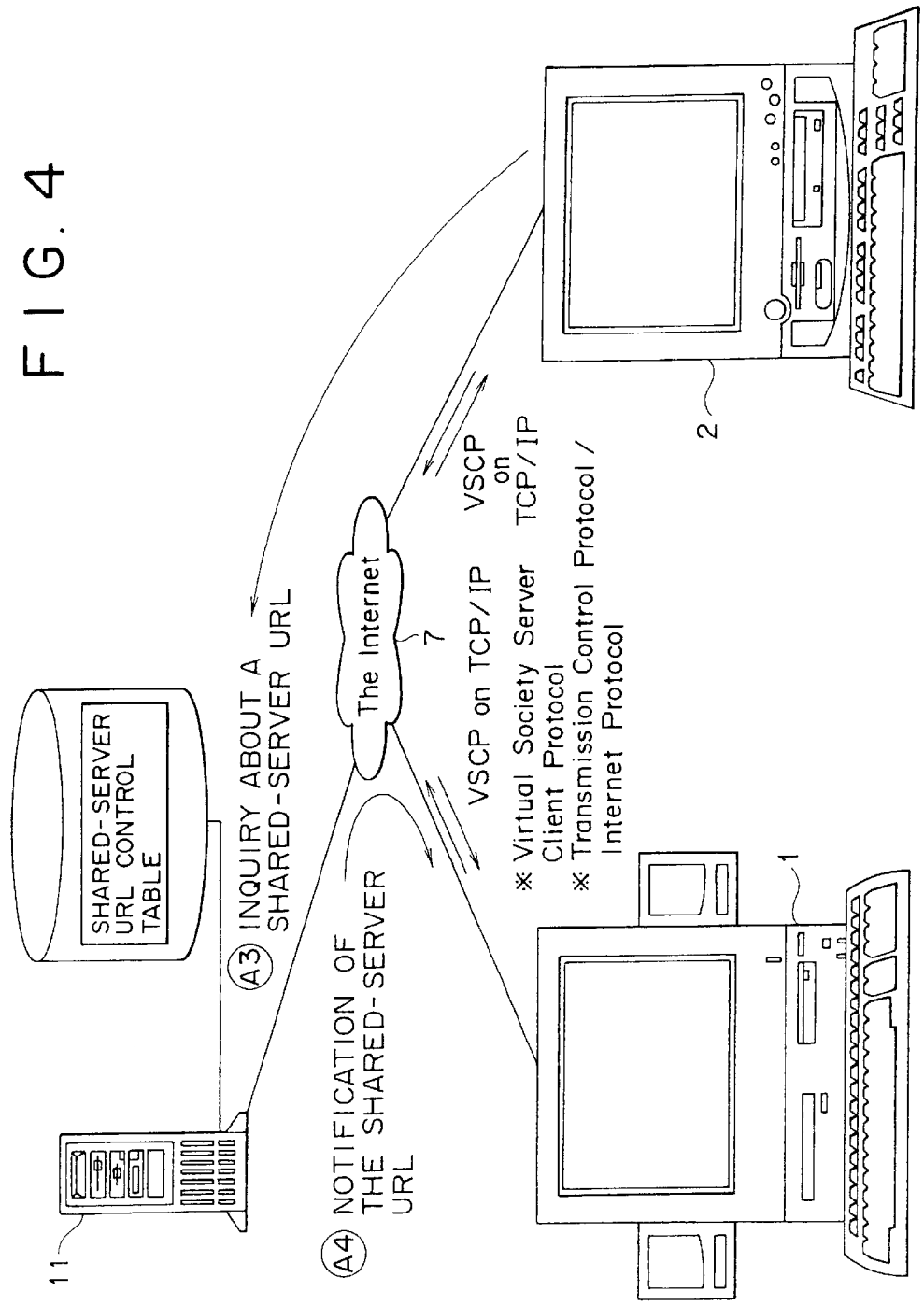
FIG. 4 is an explanatory diagram used for describing the operation of the system shown in FIG. 1.

Then, the Community Place Browser serving as a VRML2.0 browser in the client PC 1 or PC 2 interprets and executes the VRML2.0 file downloaded and temporarily stored in the local HDD 31 as shown in FIG. 4 and, as indicated by reference number A3, an inquiry about the URL of the shared server 12 is transmitted to the WLS 11 in accordance with a VSCP (Virtual Society Server Client Protocol). Upon receiving the inquiry, the WLS 1 searches a shared server URL management table stored in the HDD 11a of the shared server 12 and transmits the requested URL to the client PC 1 or PC 2 in response to the inquiry as indicated by reference number A4.

Figure 5:
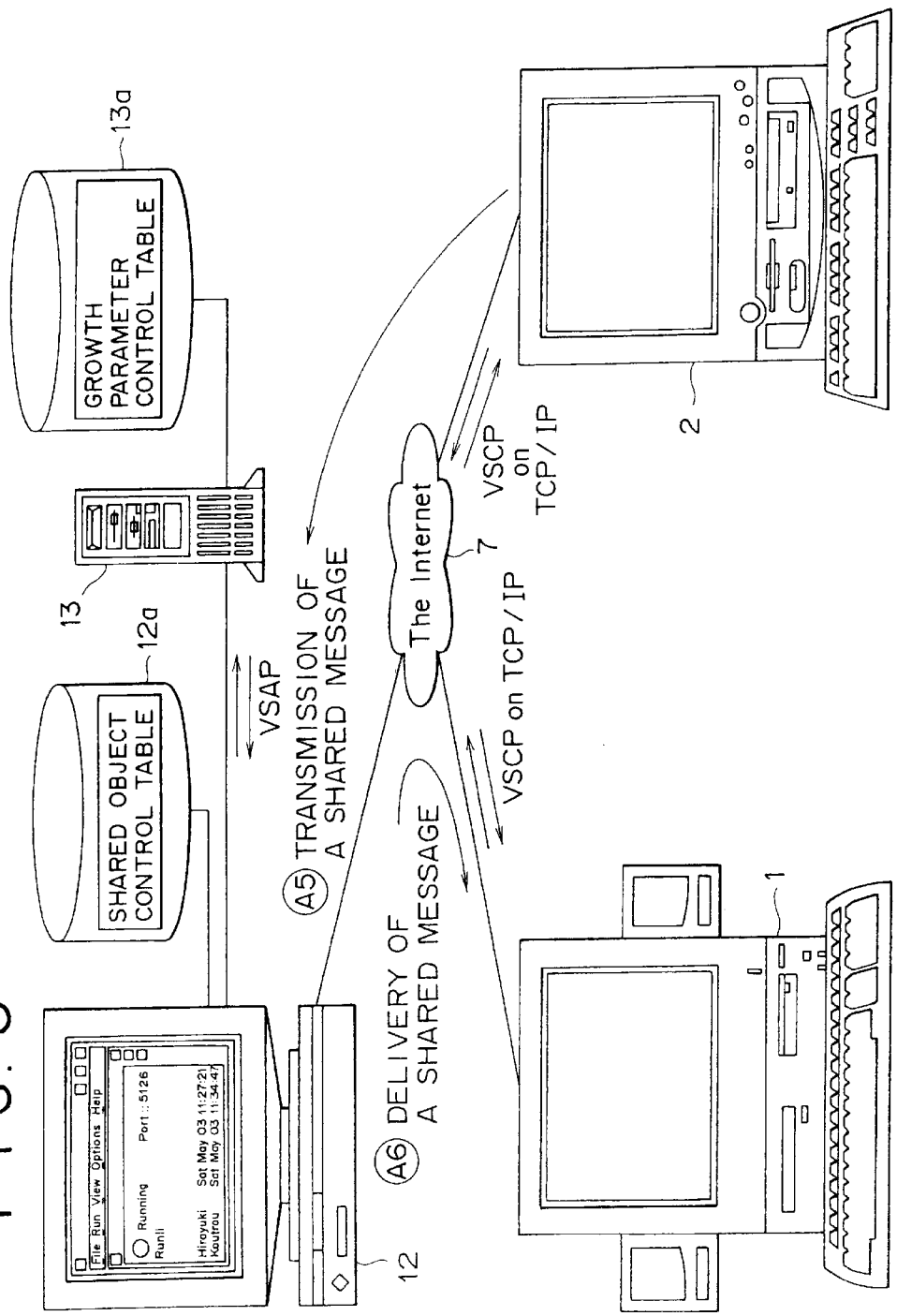
FIG. 5 is an explanatory diagram used for describing the operation of the system shown in FIG. 1.

The URL thus found is used to connect the client PCs 1 and 2 to the shared server 12 as shown in FIG. 5. As a result, a shared message on attributes of a shared 3D object such as the position and the motion thereof is transmitted by way of the shared server 12 as indicated by reference number A5 and the shared message is forwarded to other client PC as indicated by reference number A6. In this way, a multi-user environment is implemented.

For a detailed description of the above connection procedure, refer to U.S. patent application Ser. No. 08/678, 340.

While the 3-dimensional virtual space is used under a multi-user environment in this case, the 3-dimensional virtual space may be used under an environment other than a multi-user environment as well. That is to say, the 3-dimensional virtual space may be used under an environment which is referred to hereafter as a single-user environment for the sake of convenience. In a single-user environment, the avatar of another user is not let appear in the 3-dimensional virtual space and the avatar of a user herself/himself is not let appear in the 3-dimensional virtual space of the client PC other than the particular user initiating the pieces of processing indicated by reference numbers A1 and A2. For the sake of convenience, the avatar of another user and the avatar of the particular user are referred to as a drawn avatar and a pilot avatar, respectively. In order to establish a single-user environment, it is not necessary to carry out the pieces of processing indicated by reference numbers A3 to A6.

Figure 6:
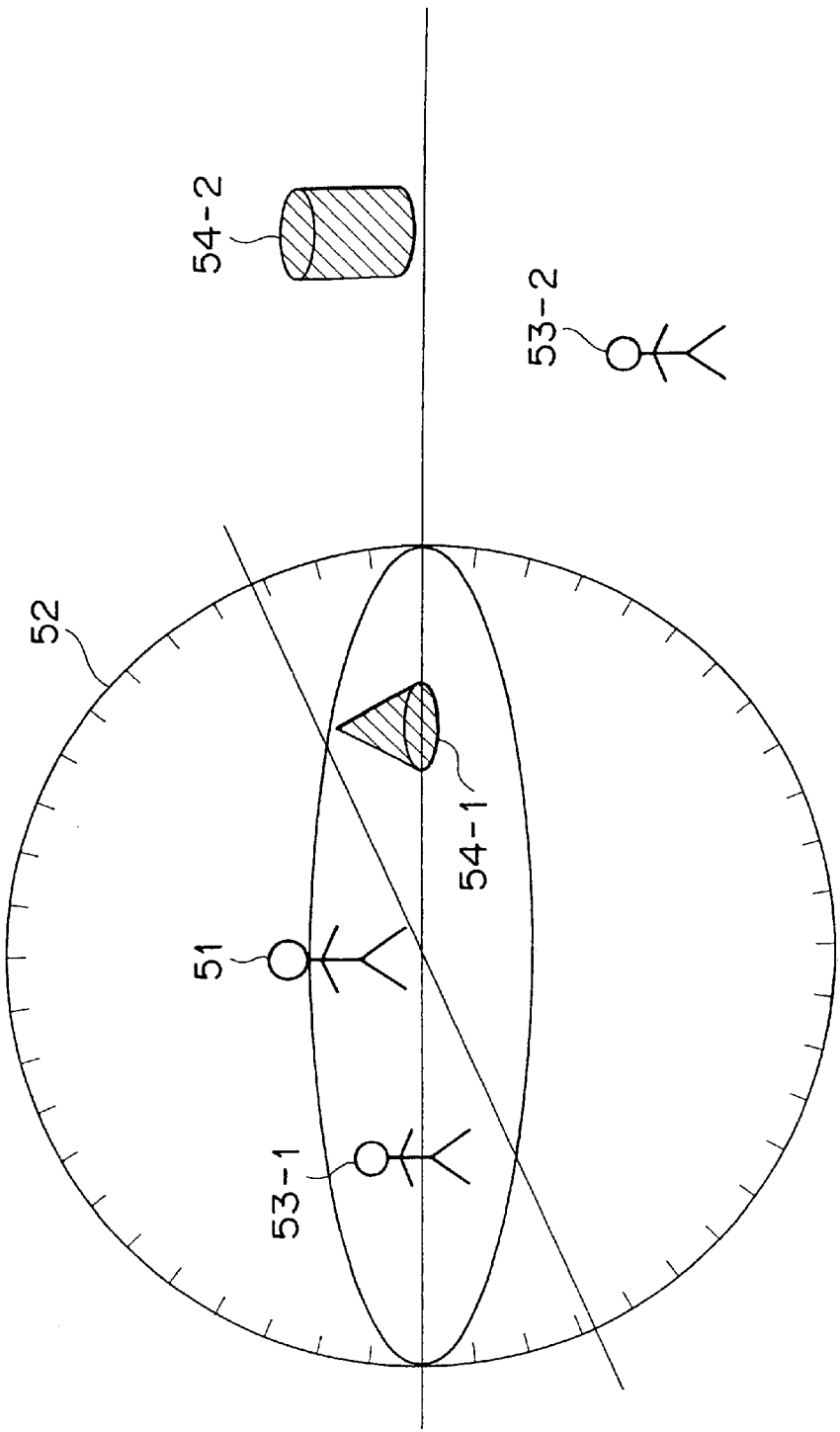
FIG. 6 is an explanatory diagram used for describing an aura.

Next, an aura is explained by referring to FIG. 6. As shown in the figure, an aura 52 with a spherical shape having a predetermined radius is formed around a pilot avatar 51 with the center of the sphere coinciding with pilot avatar 51. The pilot avatar 51 is capable of receiving information from another object located inside the aura 52. That is to say, the pilot avatar 51 is capable of visually recognizing a drawn avatar 53-1 and an application object (AO) 54-1 which are located inside the aura 52. To put it concretely, the pictures of the drawn avatar 53-1 and the object 54-1 are displayed on the CRT monitor of the client PC of the pilot avatar 51. However, the pilot avatar 51 is capable of visually recognizing neither a drawn avatar 53-2 nor an application object (AO) 54-2 which are located outside the aura 52. To put it concretely, the pictures of the drawn avatar 53-2 and the object 54-2 are not displayed on the CRT monitor of the client PC of the pilot avatar 51.

By the same token, an aura is also set for each of the other objects, namely, the drawn avatar 53-1 and the object 54-1, the drawn avatar 53-2 and the object 54-2. In this system, the size of each aura is uniform for all client PCs. It should be noted, however, that the aura of an AO can be set with a size different from the aura of the avatar if necessary.

With the aura 52 prescribed as described above, it becomes necessary for the pilot avatar 51 to acquire information from the drawn avatar 53-1 and the object 54-1, but not from the drawn avatar 53-2 and the object 54-2 which are located outside the aura 52. The amount of information to be received can thus be reduced.

Figure 7:
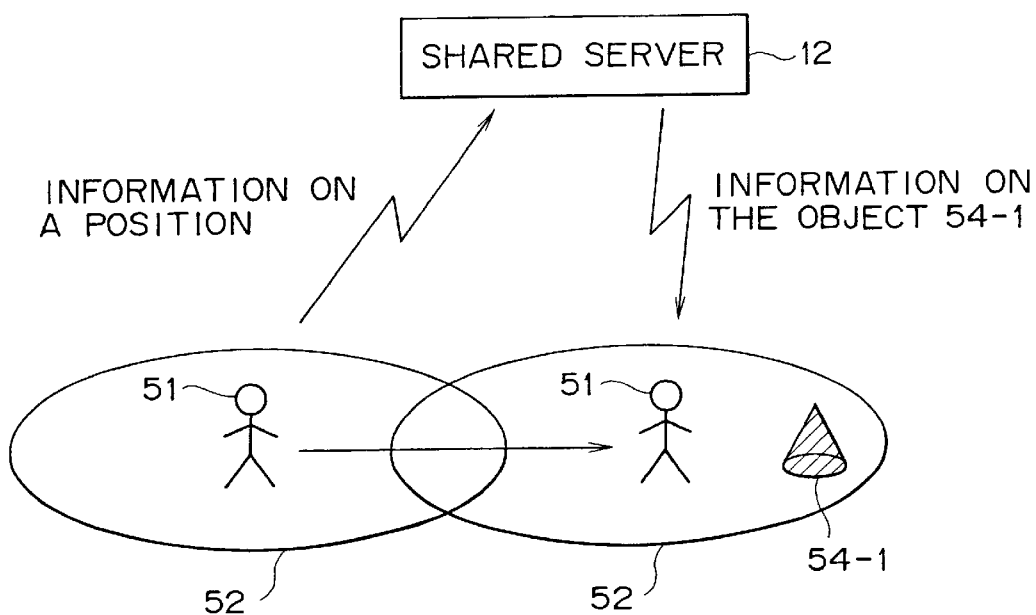
FIG. 7 is an explanatory diagram used for describing processing to allow an avatar to share information with an object in an aura of the avatar.

Consider an example shown in FIG. 7. When the avatar 51 moves, information on its new position is transmitted to the shared server 12. Upon receiving the information on the new position of the avatar 51, the shared server 12 identifies what objects (including avatars) are located inside the aura 52 centered at the new position of the avatar 51 and transmits information on the objects to the client PC of the avatar 51. In the example shown in FIG. 7, since an object 54-1 is identified as an object located inside the aura 52 centered at the new position of the avatar 51 after the movement, the shared server 12 transmits information on the object 54-1 to the client PC of the avatar 51. Upon receiving the information on the object 54-1, the client PC of the avatar 51 displays the picture of the object 54-1, allowing the user of the avatar 51 to visually recognize the object 54-1.

Figure 8:
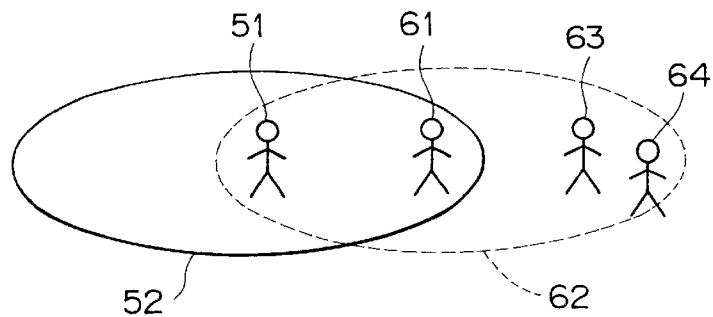
FIG. 8 is an explanatory diagram used for describing a case in which a number of avatars exist in an aura.

FIG. 8 is an explanatory diagram used for describing a case in which a number of avatars exist in an aura. When only an avatar 61 exists in the aura 52 of a pilot avatar 51, the pilot avatar 51 and the avatar 61 share pieces information owned by them. At that time, the shared server 12 receives the information owned by the pilot avatar 51 and the avatar 61, and transmits the information owned by the avatar 61 to a client PC1 associated with the pilot avatar 51 and the information owned by the pilot avatar 51 to the client PC 2 associated with the avatar 61.

As shown in FIG. 8, however, avatars 63 and 64 exist in the aura 62 of the avatar 61 in addition to the pilot avatar 51. In this case, the avatar 61 shares pieces information owned by the pilot avatar 51, the avatar 63 and the avatar 64. At that time, the shared server 12 receives the pieces of information owned by the pilot avatar 51, the avatar 61, the avatar 63, and the avatar 64, transmitting the pieces of information owned by the pilot avatar 51, the avatar 63 and the avatar 64 to a client PC associated with the avatar 61, and the pieces of information owned by the avatar 61 to the client PC1 associated with the pilot avatar 51.

In this way, when a number of objects exist in an aura, the load borne by the shared server 12 increases all of a sudden and, in addition, the amount of traffic in the Internet 7 and the LAN 9 also rises as well.

Figures 9, 10:
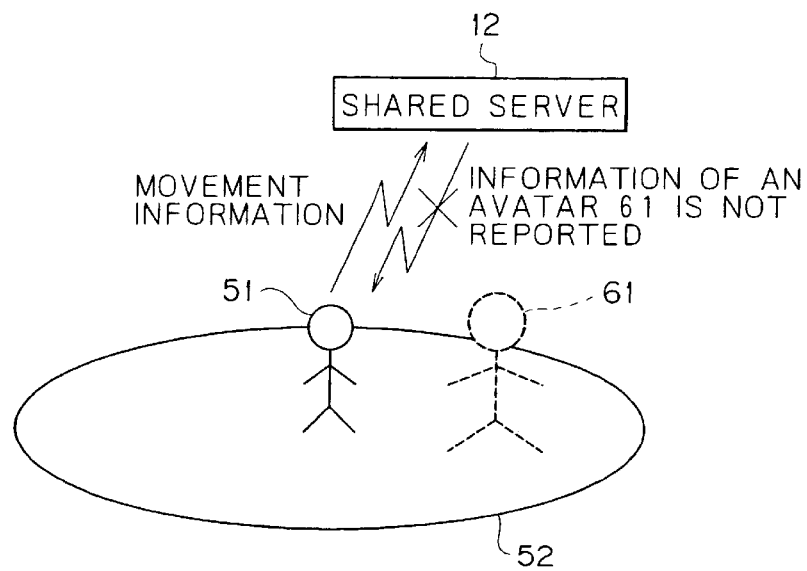
FIG. 9 is an explanatory diagram used for describing an operation in which a guest avatar does not communicate information to a pilot avatar when being set so.
FIG. 10 is an explanatory diagram used for describing an information management table stored in a shared server for each avatar shown in FIG. 8.

FIG. 9 is an explanatory diagram used for describing an operation to set a state in which the information of the guest avatar 61 is not communicated with the pilot avatar 51 in order to prevent a load borne by the shared server 12 from increasing all of a sudden even if a number of objects exist in the aura 52 of the pilot avatar 51. In the state where the information of the guest avatar 61 is not to be communicated with the pilot avatar 51, the shared server 12 transmits information owned by the pilot avatar 51 to a client PC associated with the avatar 61, but the shared server 12 does not transmit the information owned by the avatar 61 to the client PC 1 associated with the pilot avatar 51. As a result, the load of processing borne by the shared server 12 and the amount of traffic on the transmission line do not increase all of a sudden even if there are many avatars such as the guest avatar 61 entering the auras 52 of the pilot avatar 51 in comparison with a case in which each object shares pieces of information owned by other objects. (Note that the guest avatar 61 transmits its information to the shared server 12, and the guest avatar 61 will receive information from the shared server 12 depending upon the objects in its aura and their transparency settings.)

FIG. 10 is an explanatory diagram used for describing an information management table 12a provided in the shared server 12 for each avatar. As shown in FIG. 10, the information management table for an avatar comprises a list of names of objects each having an aura covering the position of the avatar itself, a list of names of objects located in the aura of the avatar, and the avatar's transparency flag having a logic value of either TRUE or FALSE. The contents of the list of names of objects each having an aura including the position of the avatar itself and the list of names of objects located in the aura of the avatar are updated by the shared server 12 in accordance with the behavior of the avatar owning the lists and the movements of the objects on the lists in the 3-dimensional virtual space.

The shared server 12 does not transmit information owned by an avatar having a TRUE transparency flag to other avatars. When an avatar having a FALSE transparency flag enters or gets included in the aura of another avatar, the shared server 12 transmits information owned by the avatar with a FALSE transparency flag to the other avatar. The setting of a transparency flag can be changed by operating the client PCs 1 to 3 by the users.

By setting the transparency flag in the information management table of an avatar to a TRUE logic value as described above, the information of the avatar is not transmitted to other objects and, hence, the transmission of information to other avatars can be restricted.

As an example, the information in the information management table of FIG. 10 will be detailed with reference to FIGS. 8 and 9. As shown in FIG. 8, the avatar 61 is included in the aura of the avatar 51 and includes the avatars 51, 63 and 64 in its aura. As shown in FIG. 9, the avatar 61 has a true transparency flag. As shown in FIG. 8, the avatar 51 is included in the aura of the avatar 61 and includes the avatar 61 in its aura. As shown in FIG. 9, the avatar 51 has a false transparency flag.

Figure 11:
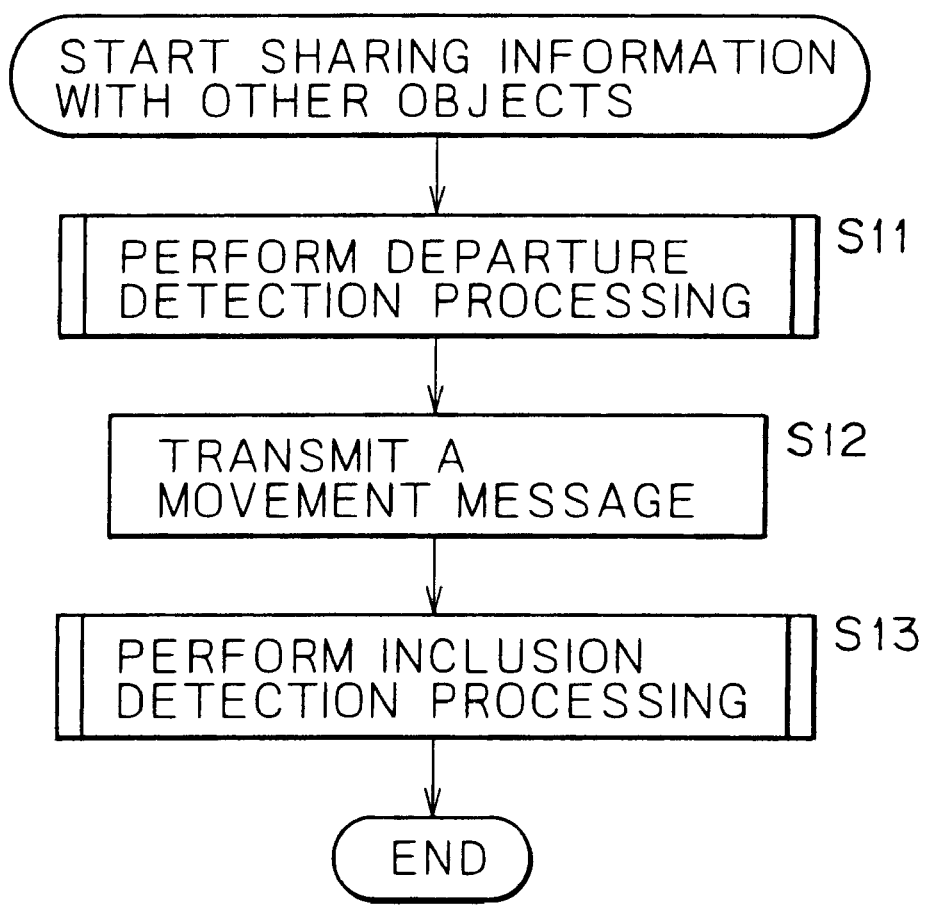
FIG. 11 is a flowchart representing processing to share information with other avatars.

Next, processing to share information with other avatars is explained by referring to a flowchart shown in FIG. 11. The processing is started when the shared server 12 is informed of a movement to another location by an avatar (or an object) or is notified of a change in transparency flag of the avatar. As shown in FIG. 11, the flowchart begins with a step S11 in which the shared server 12 carries out departure detection processing to detect an exclusion of an object from the aura of an avatar as will be described later by referring to a flowchart shown in FIG. 12. The flow of the processing then goes on to a step S12 in which the shared server 12 transmits a movement message which was received before the processing of the step S11 to other client PCs. Then, the flow of the processing proceeds to a step S13 in which the shared server 12 carries out inclusion detection processing to detect an inclusion of each object into the aura of an avatar as will be described later by referring to a flowchart shown in FIG. 13.

Figure 12A:
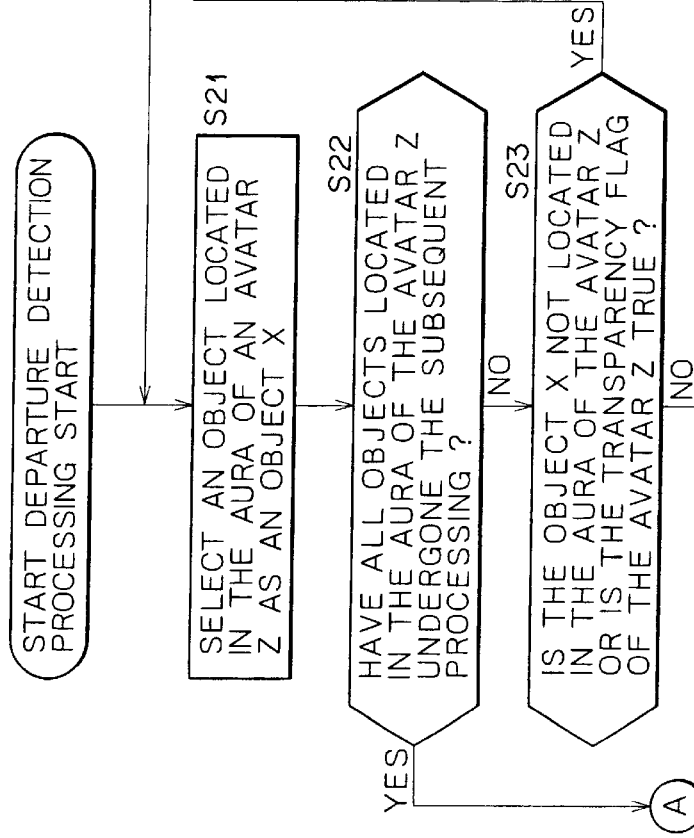

Details of the departure detection processing carried out at the step S11 of the flowchart shown in FIG. 11 are explained by referring to the flowchart shown in FIGS. 12A–12B as follows. As shown in FIG. 12A, the flowchart begins with a step S21 in which the shared server 12 selects an object located in the aura of the avatar, which is a pilot avatar Z, from those listed in the information management table as an object X. The flow of the processing then goes on to a step S22 in which the shared server 12 forms a judgment as to whether or not all objects located in the aura of the pilot avatar Z as indicated by the information management table have undergone pieces of processing of steps S23 to S26. If all objects located in the aura of the pilot avatar Z as indicated by the information management table have not undergone the pieces of processing of the steps S23 to S26, the flowchart goes on to the step S23. At the step S23, the shared server 12 forms a judgment as to whether or not the object X is located in the aura of the pilot avatar Z, or examines the information management table to find out whether the transparency flag of the pilot avatar Z is TRUE or FALSE. If the object X is not located in the aura of the pilot avatar Z anymore or the transparency flag of the pilot avatar Z is found TRUE, the flow of the processing proceeds to a step S24.

At the step S24, the shared server 12 deletes the object X from the list of names of objects located in the aura of the pilot avatar Z as shown by the information management table for the pilot avatar Z if the object X is found on the list. The object X needs to be deleted from the list since the object X has been excluded from the aura of the pilot avatar Z, or even if the object X is still included in the aura of the pilot avatar Z, the object X needs to be deleted from the list since the pilot avatar Z is now transparent to the object X. The flow of the processing then continues to a step S25 in which the shared server 12 deletes the pilot avatar Z from the list of names of objects each having an aura covering the position of the object X, if the pilot avatar Z is found on the list. Then, the flow of the processing goes on to the step S26 in which the shared server 12 updates the information management tables of the pilot avatar Z and the object X in accordance with the deletions at the steps S24 and S25, respectively. The flow of the processing then goes back to the step S21.

If the outcome of the judgment formed at the step S23 indicates that the object X is still located in the aura of the pilot avatar Z and the transparency flag of the pilot avatar Z is found FALSE, on the other hand, the flow of the processing goes back to the step S21, skipping the pieces of processing of the steps S24 to S26. This is because the deletion of the object X from the list at the step S24 is not required and the counterpart processing at the step S25 is thus also unnecessary as well. As a result, the updating of the information management tables at the step S26 is not necessary.

If the outcome of the judgment formed at the step S22 indicates that all objects located in the aura of the pilot avatar Z as indicated by the information management table have undergone the pieces of processing of the steps S23 to S26, on the other hand, the flowchart goes on to the step S27 in which the shared server 12 selects an object having an aura covering the position of the pilot avatar Z from those listed in the information management table as an object X. The flow of the processing then goes on to the step S28 in which the shared server 12 forms a judgment as to whether or not all objects each having an aura covering the position of the pilot avatar Z as indicated by the information management table have undergone pieces of processing of steps S29 to S32. If all objects each having an aura covering the position of the pilot avatar Z as indicated by the information management table have not undergone the pieces of processing of the steps S29 to S32, the flowchart goes on to the step S29. At the step S29, the shared server 12 forms a judgment as to whether or not the pilot avatar Z is located in the aura of the object X, or examines the information management table to find out whether the transparency flag of the object X is TRUE or FALSE.

If the outcome of the judgment formed at the step S29 indicates that the pilot avatar Z is not located in the aura of the object X anymore or the transparency flag of the object X is found TRUE, the flow of the processing proceeds to a step S30 in which the shared server 12 deletes the pilot avatar Z from the list of names of objects included in the aura of the object X as shown by the information management table for the object X provided that the pilot avatar Z is found on the list. The pilot avatar Z needs to be deleted from the list since the pilot avatar Z has departed from the aura of the object X, or even if the pilot avatar Z is still included in the aura of the object X, the pilot avatar Z needs to be deleted from the list since the object X is now transparent to the pilot avatar Z. The flow of the processing then continues to a step S31 in which the shared server 12 deletes the object X from the list of names of objects each having an aura including the position of the pilot avatar Z as shown in the information management table for the pilot avatar Z as counterpart processing of the step S30 if the object X is found on the list. Then, the flow of the processing goes on to the step S32 in which the shared server 12 updates the information management tables of the pilot avatar Z and the object X in accordance with the deletions at the steps S31 and S30, respectively. The flow of the processing then goes back to the step S27.

If the outcome of the judgment formed at the step S29 indicates that the pilot avatar Z is still located in the aura of the object X and the transparency flag of the object X is found FALSE, on the other hand, the flow of the processing goes back to the step S27, skipping the pieces of processing of the steps of S30 to S32. This is because the deletion of the pilot avatar Z from the list at the step S30 is not required and the counterpart processing at the step S31 is thus also unnecessary as well. As a result, the updating of the information management tables at the step S32 is not necessary.

If the outcome of the judgment formed at the step S28 indicates that all objects each having an aura including the position of the pilot avatar Z have been undergone, on the other hand, the processing represented by the flowcharts shown in FIGS. 12A–12B is ended.

The processing to detect an exclusion of an object from the aura of the avatar Z, or the pilot avatar, is carried out as described above.

Details of the departure detection processing carried out at the step S13 of the flowchart shown in FIG. 11 are explained by referring to the flowcharts shown in FIGS. 13A–13B as follows. As shown in FIG. 13A, the flowchart begins with a step S41 in which the shared server 12 selects an object from those in the virtual space as an object X. The flow of the processing then goes on to a step S42 in which the shared server 12 forms a judgment as to whether or not all objects located in the virtual space have undergone pieces of processing at the subsequent steps. If all objects located in the virtual space have not undergone the subsequent pieces of processing, the flowchart goes on to the step S43 in which the shared server 12 forms a judgment as to whether or not the object X is a pilot avatar Z itself. If the outcome of the judgment formed at the step S43 indicates that the object X is the pilot avatar Z itself, the flow of the processing goes back to the step S41.

If the outcome of the judgment formed at the step S43 indicates that the object X is not the pilot avatar Z itself, on the other hand, the flow of the processing goes on to a step S44 in which the shared server 12 refers to the information management table of the object X to find out whether the transparency flag is TRUE or FALSE. If the transparency flag is found FALSE, the flow of the processing goes on to a step S45 in which the shared server 12 examines the information management table of the pilot avatar Z to find out, if the object X is not on the list of objects included in the aura of the pilot avatar Z and forms a judgment as to whether or not the object X has gotten included in the aura of the pilot avatar Z. If the information management table shows that the object X is not on the list of objects included in the aura of the pilot avatar Z, but a result of the judgment formed at the step S45 indicates that the object X has actually gotten included in the aura of the pilot avatar Z, the flow of the processing goes on to a step S46. At the step S46, the shared server 12 adds the object X to the list of names of objects located in the aura of the pilot avatar Z as shown by the information management table for the pilot avatar Z. The flow of the processing then continues to a step S47 in which the shared server 12 adds the pilot avatar Z to the list of names of objects each having an aura including the position of the object X as shown in the information management table for the object X as counterpart processing of the step S46. Then, the flow of the processing goes on to the step S48 in which the shared server 12 updates the information management tables of the pilot avatar Z and the object X in accordance with the cataloging at the steps S46 and S47, respectively. The flow of the processing then goes on to a step S49.

If the outcome of the judgment formed at the step S44 indicates that the transparency flag of the object X is TRUE, on the other hand, the flow of the processing goes on directly to the step S49, skipping the steps of S46 to S48. This is because, since the object X is transparent to the pilot avatar Z, the cataloging of the object X at the step S46 is not required. Thus, the counterpart cataloging of the pilot avatar Z at the step S47 is also unnecessary as well. As a result, the cataloging of the information management tables at the step S48 is not necessary. In addition, if the information management table at the step S45 shows that the object X is on the list of objects included in the aura of the pilot avatar Z or the result of the judgment formed at the step S45 indicates that the object X is not included in the aura of the pilot avatar Z, on the other hand, the flow of the processing goes on directly to the step S49, skipping the steps of S46 to S48. This is because, since the object X is already cataloged on the list of the information management table, or the object X is not really included in the aura of the pilot avatar Z, it is not necessary to catalog the object X on the list or the cataloging of the object X at the step S46 is not required. Thus, the counterpart cataloging of the pilot avatar Z at the step S47 is also unnecessary as well. As a result, the updating of the information management tables at the step S48 is not necessary.

The flow of the processing then goes on to a step S49 in which the shared server 12 refers to the information management table of the pilot avatar Z to find out whether the transparency flag is TRUE or FALSE. If the transparency flag of the pilot avatar is found FALSE, the flow of the processing goes on to a step S50 in which the shared server 12 examines the information management table of the pilot avatar Z to find out if the object X is on the list of objects each having an aura including the pilot avatar Z and forms a judgment as to whether or not the pilot avatar Z has entered the aura of the object. If the information management table shows that the object X is not on the list of objects each having an aura including the pilot avatar Z, but a result of the judgment formed at the step S50 indicates that the pilot avatar Z has actually entered the aura of the object X, the flow of the processing goes on to a step S51, in which the shared server 12 adds the pilot avatar Z to the list of names of objects included in the aura of the object X as shown in the information management table for the object X. At a step S52 following the step S51, the shared server 12 thus adds the object X to the list of names of objects each having an aura including the pilot avatar Z as shown by the information management table for the pilot avatar Z. Then, at a step S53, the shared server 12 updates the information management tables of the pilot avatar Z and the object X in accordance with the cataloging at the steps S51 and S52, respectively. The flow of the processing then goes back to the step S41.

If the outcome of the judgment formed at the step S49 indicates that the transparency flag of the pilot avatar Z is TRUE, on the other hand, the flow of the processing goes back directly to the step S41, skipping the steps S51 to S53. This is because, since the pilot avatar Z is transparent to the object X, the cataloging of the pilot avatar Z at the step S51 is not required. Thus, the counterpart cataloging of the object X at the step S52 is also unnecessary as well. As a result, the cataloging of the information management tables at the step S53 is not necessary. In addition, if the information management table at the step S50 shows that the object X is on the list of objects each having an aura including the pilot avatar Z or the result of the judgment formed at the step S50 indicates that the pilot avatar Z is not included in the aura of the pilot object X, on the other hand, the flow of the processing goes back directly to the step S41, skipping the steps S51 to S53. This is because, since the object X is already cataloged on the list of the information management table or the pilot avatar Z is not really included in the aura of the pilot object X, it is not necessary to catalog the object X on the list, or the cataloging of the object X at the step S52 is not required. Thus, the counterpart cataloging of the pilot avatar Z at the step S51 is also unnecessary as well. As a result, the cataloging of the information management tables at the step S53 is not necessary.

If the outcome of the judgment formed at the step S42 indicates that all objects located in the virtual space have undergone pieces of processing, on the other hand, the processing represented by the flowcharts shown in FIGS. 13A–13B is ended.

The processing to detect an inclusion of an object into: the aura of the pilot avatar Z is carried out as described above.

In this specification, a system means a whole configuration comprising a plurality of apparatus and objects.

It should be noted that a computer program to be executed to carry out the various kinds of processing described above is presented to the client in computer-readable form through presentation media which can be communication presentation media such as a network and a digital satellite or information recording media such as a solid-state memory, a CD-ROM and a magnetic disc.

It should be understood that various alternatives to the embodiments of the invention described herein may be employed in practicing the invention. It is intended that the following claims define the scope of the invention and that structures within the scopes of these claims and their equivalents are covered thereby.

What is claimed is:

1. An information processing apparatus for presenting a 3-dimensional virtual space and allowing an avatar of a plurality of avatars in said 3-dimensional space to be operated to communicate with one or more other avatars of said plurality of avatars, said avatar representing a user, said information processing apparatus comprising:

a storage means for storing an indicator set by said user representing whether said avatar's presence within said 3-dimensional space is to be communicated to or withheld from said other avatars;

a judgment means for determining whether said information is to be communicated with said other avatars based on said indicator stored in said storage means; and a processing means for processing said information when said information is to be communicated with said other avatars, as determined by said judgment means.

2. The information processing apparatus of claim 1, wherein: said indicator is represented by a transparency flag.

3. The information processing apparatus of claim 2, wherein:

said processing means communicates said information to said other avatars when said transparency flag is set to a first setting; and said processing means does not communicate said information to said other avatars when said transparency flag is set to a second setting.

4. The information processing apparatus of claim 2, wherein:

said transparency flag is changeable between true and false.

5. The information processing apparatus of claim 1, wherein:

said storage means is further for storing a plurality of information management tables each indicating whether a corresponding one of said plurality of avatars has an aura containing each other of said plurality of avatars; and said judgment means is further for determining whether said information is to be communicated with said other avatars, based on said plurality of information management tables.

6. The information processing apparatus of claim 5, further comprising:

a departure detection control means for controlling said storage means, said judgment means, and said processing means during departure detection processing for said plurality of avatars; and an inclusion detection control means for controlling said storage means, said judgment means, and said processing means during inclusion detection processing for said plurality of avatars.

7. The information processing apparatus of claim 6, wherein said departure detection control means comprises:

a first selection means for selecting a first subset of said other avatars from said information management table of said avatar based on said aura of said avatar;

a first determination means for determining whether said first subset is no longer contained in said aura of said avatar and whether said indicator for said avatar is set;

a first update means for updating one or more of said plurality of information management tables corresponding to said avatar and said first subset, in accordance with said first determination means;

a second selection means for selecting a second subset of said other avatars from said information management table of said avatar based on said auras of said second subset;

a second determination means for determining whether said avatar is no longer contained in said auras of said second subset and whether said indicators for said second subset are set; and a second update means for updating at least one of said plurality of information tables corresponding to said avatar and said second subset, in accordance with said second determination means.

8. The information processing apparatus of claim 6, wherein said inclusion detection control means comprises:

a selection means for selecting said other avatars;

a first determination means for determining whether said indicator for each said other avatars is not set, whether said information management table of said avatar shows that said other avatars are not contained in said aura of said avatar, and whether said other avatars are contained in said aura of said avatar;

a first update means for updating said plurality of information management tables, in accordance with said first determination means;

a second determination means for determining whether said indicator for said avatar is not set, whether said information management table of said avatar shows that said avatar is no longer contained in said auras of said other avatars, and whether said avatar is contained in said auras of said other avatars; and a second update means for updating said plurality of information management tables, in accordance with said second determination means.

9. An information processing method for presenting a 3-dimensional virtual space and allowing an avatar of a plurality of avatars in said 3-dimensional virtual space to be operated to communicate with one or more other avatars of said plurality of avatars, said avatar representing a user, said information processing method comprising the steps of:

a storage step of storing an indicator set by said user representing whether regarding said avatar's presence within the 3-dimensional space is to be communicated to or withheld from said other avatars;

a judgment step of determining whether said information is to be communicated with said other avatars, based on said indicator stored at said storage step; and a processing step of processing said information when said information is to be communicated with said other avatars, as determined in said judgment step.

10. The information processing method of claim 9, wherein:

said indicator is represented by a transparency flag.

11. The information processing method of claim 10, wherein:

said processing step communicates said information to said other avatars when said transparency flag is set to a first setting; and said processing step does not communicate said information to said other avatars when said transparency flag is set to a second setting.

12. The information processing method of claim 10, wherein:

said transparency flag is changeable between true and false.

13. The information processing method of claim 9, wherein:

said storage step further stores a plurality of information management tables each indicating whether a corresponding one of said plurality of avatars has an aura containing each other of said plurality of avatars; and said judgment step further determines whether said information is to be communicated with said other avatars, based on said plurality of information management tables.

14. The information processing method of claim 13, further comprising:

a departure detection control step of controlling said storage step, said judgment step, and said processing step during departure detection processing for said plurality of avatars; and an inclusion detection control step of controlling said storage step, said judgment step, and said processing step during inclusion detection processing for said plurality of avatars.

15. The information processing method of claim 14, wherein said departure detection control step comprises:
   a first selection step of selecting a first subset of said other avatars from said information management table of said avatar based on said aura of said avatar;
   a first determination step of determining whether said first subset is no longer contained in said aura of said avatar and whether said indicator for said avatar is set;
   a first update step of updating one or more of said plurality of information management tables corresponding to said avatar and said first subset, in accordance with said first determination step;
   a second selection step of selecting a second subset of said other avatars from said information management table of said avatar based on said auras of said second subset;
   a second determination step of determining whether said avatar is no longer contained in said auras of said second subset and whether said indicators for said second subset are set; and
   a second update step of updating at least one of said plurality of information tables corresponding to said avatar and said second subset, in accordance with said second determination step.

16. The information processing method of claim 14, wherein said inclusion detection control step comprises:
   a selection step of selecting said other avatars;
   a first determination step of determining whether said indicator for each said other avatars is not set, whether said information management table of said avatar shows that said other avatars are not contained in said aura of said avatar, and whether said other avatars are contained in said aura of said avatar;
   a first update step of updating said plurality of information management tables, in accordance with said first determination step;
   a second determination step of determining whether said indicator for said avatar is not set, whether said information management table of said avatar shows that said avatar is no longer contained in said auras of said other avatars, and whether said avatar is contained in said auras of said other avatars; and
   a second update step of updating said plurality of information management tables, in accordance with said second determination step.

17. A computer-readable medium for presenting a program executable by a computer to drive an information processing apparatus for presenting a 3-dimensional virtual space and allowing an avatar of a plurality of avatars in said 3-dimensional virtual space to be operated to communicate with one or more other avatars of said plurality of avatars, said avatar representing a user, said program to carry out processing including:
   a storage step of storing an indicator set by said user representing whether said avatar's presence within said 3-dimensional space is to be communicated to or withheld from said other avatars;
   a judgment step of determining whether said information is to be communicated with said other avatars, based on said indicator stored at said storage step; and
   a processing step of processing said information when said information is to be communicated with said other avatars, as determined in said judgment step.

18. The computer-readable medium of claim 17, wherein: said indicator is represented by a transparency flag.

19. The computer-readable medium of claim 18, wherein:
   said processing step communicates said information to said other avatars when said transparency flag is set to a first setting; and
   said processing step does not communicate said information to said other avatars when said transparency flag is set to a second setting.

20. The computer-readable medium of claim 18, wherein: said transparency flag is changeable between true and false.

21. The computer-readable medium of claim 17, wherein:
   said storage step further stores a plurality of information management tables each indicating whether a corresponding one of said plurality of avatars has an aura containing each other of said plurality of avatars; and
   said judgment step further determines whether said information is to be communicated with said other avatars, based on said plurality of information management tables.

22. The computer-readable medium of claim 21, wherein said program further comprises:
   a departure detection control step of controlling said storage step, said judgment step, and said processing step during departure detection processing for said plurality of avatars; and
   an inclusion detection control step of controlling said storage step, said judgment step, and said processing step during inclusion detection processing for said plurality of avatars.

23. The computer-readable medium of claim 22, wherein said departure detection control step comprises:
   a first selection step of selecting a first subset of said other avatars from said information management table of said avatar based on said aura of said avatar;
   a first determination step of determining whether said first subset is no longer contained in said aura of said avatar and whether said indicator for said avatar is set;
   a first update step of updating one or more of said plurality of information management tables corresponding to said avatar and said first subset, in accordance with said first determination step;
   a second selection step of selecting a second subset of said other avatars from said information management table of said avatar based on said auras of said second subset;
   a second determination step of determining whether said avatar is no longer contained in said auras of said second subset and whether said indicators for said second subset are set; and
   a second update step of updating at least one of said plurality of information tables corresponding to said avatar and said second subset, in accordance with said second determination step.

24. The computer-readable medium of claim 22, wherein said inclusion detection control step comprises:
   a selection step of selecting said other avatars;
   a first determination step of determining whether said indicator for each said other avatars is not set, whether said information management table of said avatar shows that said other avatars are not contained in said aura of said avatar, and whether said other avatars are contained in said aura of said avatar;
   a first update step of updating said plurality of information management tables, in accordance with said first determination step;

a second determination step of determining whether said indicator for said avatar is not set, whether said information management table of said avatar shows that said avatar is no longer contained in said auras of said other avatars, and whether said avatar is contained in said auras of said other avatars; and a second update step of updating said plurality of information management tables, in accordance with said second determination step.

25. An information processing apparatus for presenting a 3-dimensional virtual space and allowing an avatar of a plurality of avatars in said 3-dimensional virtual space to be operated to communicate with one or more other avatars of said plurality of avatars, said avatar representing a user, said information processing apparatus comprising:

a storage element configured to store an indicator set by said user representing whether said avatar's presence within said 3-dimensional space is to be communicated to or withheld from said other avatars; and a processor, coupled to said storage element, configured to determine whether said information is to be communicated with said other avatars, based on said indicator stored in said storage element, wherein said processor is further configured to process said information when said information is to be communicated with said other avatars, as determined on the basis of said indicator.

26. The information processing apparatus of claim 25, wherein:

said indicator is represented by a transparency flag.

27. The information processing apparatus of claim 26, wherein:

said processor is further configured to communicate said information to said other avatars when said transparency flag is set to a first setting; and said processor is still further configured not to communicate said information to said other avatars when said transparency flag is set to a second setting.

28. The information processing apparatus of claim 26, wherein:

said transparency flag is changeable between true and false.

29. The information processing apparatus of claim 25, wherein:

said storage element is further configured to store a plurality of information management tables each indicating whether a corresponding one of said plurality of avatars has an aura containing each other of said plurality of avatars; and said processor is further configured to determine whether said information is to be communicated with said other avatars, based on said plurality of information management tables.

30. The information processing apparatus of claim 29, wherein:

said processor is further configured to perform departure detection processing and inclusion detection processing for said plurality of avatars.

31. The information processing apparatus of claim 30, wherein said processor is further configured to operate as follows during departure detection processing:

to perform first selection processing to select a first subset of said other avatars from said information management table of said avatar based on said aura of said avatar;

to perform first determination processing to determine whether said first subset is no longer contained in said aura of said avatar and whether said indicator for said avatar is set;

to perform first update processing to update one or more of said plurality of information management tables corresponding to said avatar and said first subset, in accordance with said first determination processing;

to perform second selection processing to select a second subset of said other avatars from said information management table of said avatar based on said auras of said second subset;

to perform second determination processing to determine whether said avatar is no longer contained in said auras of said second subset and whether said indicators for said second subset are set; and to perform second update processing to update at least one of said plurality of information tables corresponding to said avatar and said second subset, in accordance with said second determination processing.

32. The information processing apparatus of claim 30, wherein said processor is further configured to operate as follows during inclusion detection processing:

to perform selection processing to select said other avatars;

to perform first determination processing to determine whether said indicator for each said other avatars is not set, whether said information management table of said avatar shows that said other avatars are not contained in said aura of said avatar, and whether said other avatars are contained in said aura of said avatar;

to perform first update processing to update said plurality of information management tables, in accordance with said first determination processing;

to perform second determination processing to determine whether said indicator for said avatar is not set, whether said information management table of said avatar shows that said avatar is no longer contained in said auras of said other avatars, and whether said avatar is contained in said auras of said other avatars; and to perform second update processing to update said plurality of information management tables, in accordance with said second determination processing.

33. The information processing apparatus of claim 27, wherein:

said first setting is true; and said second setting is false.

34. The information processing apparatus of claim 27, wherein:

said first setting is false; and said second setting is true.

* * * * *